US011157426B2

(12) United States Patent
Suzuki

(10) Patent No.: US 11,157,426 B2
(45) Date of Patent: Oct. 26, 2021

(54) EVALUATION APPARATUS, SEMICONDUCTOR APPARATUS, AND TRANSMISSION CONTROL METHOD

(71) Applicant: TOSHIBA MEMORY CORPORATION, Minato-ku (JP)

(72) Inventor: Tomoaki Suzuki, Chigasaki (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 68 days.

(21) Appl. No.: 16/566,323

(22) Filed: Sep. 10, 2019

(65) Prior Publication Data

US 2020/0293470 A1 Sep. 17, 2020

(30) Foreign Application Priority Data

Mar. 14, 2019 (JP) .............................. JP2019-047588

(51) Int. Cl.
*G06F 13/16* (2006.01)
*G06F 13/40* (2006.01)

(52) U.S. Cl.
CPC ...... *G06F 13/1689* (2013.01); *G06F 13/1694* (2013.01); *G06F 13/4068* (2013.01)

(58) Field of Classification Search
CPC ............ G06F 13/1689; G06F 13/1694; G06F 13/3625; G06F 13/4068; G06F 13/4295; G06F 2213/0026
See application file for complete search history.

(56) References Cited

U.S. PATENT DOCUMENTS

| 9,436,630 | B2 | 9/2016 | Yousuf | |
| 10,298,456 | B1* | 5/2019 | Chang | ..................... G06F 1/206 |
| 2012/0265919 | A1 | 10/2012 | Jono et al. | |
| 2019/0238179 | A1* | 8/2019 | Iyer | .......................... H04B 3/40 |
| 2020/0409896 | A1* | 12/2020 | Das Sharma | ......... G06F 13/405 |

FOREIGN PATENT DOCUMENTS

| JP | 2951396 B2 | 9/1999 |
| JP | 5346979 B2 | 11/2013 |
| JP | 2016-526716 A | 9/2016 |

OTHER PUBLICATIONS

PHY Interface For the PCI Express* Architecture, PCI Express 3.0, Revision .9, 2010, 53 pages.
PHY Interface For the PCI Express, SATA, and USB 3.1 Architectures, Version 4.4.1, 2016, 114 pages.

* cited by examiner

*Primary Examiner* — Yong J Choe
(74) *Attorney, Agent, or Firm* — Oblon, McClelland, Maier & Neustadt, L.L.P.

(57) ABSTRACT

According to one embodiment, there is provided an evaluation apparatus including a first data bus and a transmission device. The transmission device is electrically connected to the first data bus at an output side thereof and configured to receive data and another signal different from the data. The transmission device is configured to supply the data to the first data bus in a first period during which a valid signal is in an active level, and supply the another signal to the first data bus in a second period during which the valid signal is in a non-active level.

20 Claims, 8 Drawing Sheets

US 11,157,426 B2

EVALUATION APPARATUS, SEMICONDUCTOR APPARATUS, AND TRANSMISSION CONTROL METHOD

CROSS-REFERENCE TO RELATED APPLICATIONS

This application is based upon and claims the benefit of priority from Japanese Patent Application No. 2019-047588, filed on Mar. 14, 2019; the entire contents of which are incorporated herein by reference.

FIELD

Embodiments described herein relate generally to an evaluation apparatus, a semiconductor apparatus, and a transmission control method.

BACKGROUND

In an evaluation apparatus such as an evaluation board, a transmission device is tested before being shipped. At this time, it is desired to reduce cost for the test.

DETAILED DESCRIPTION

Figure 1:
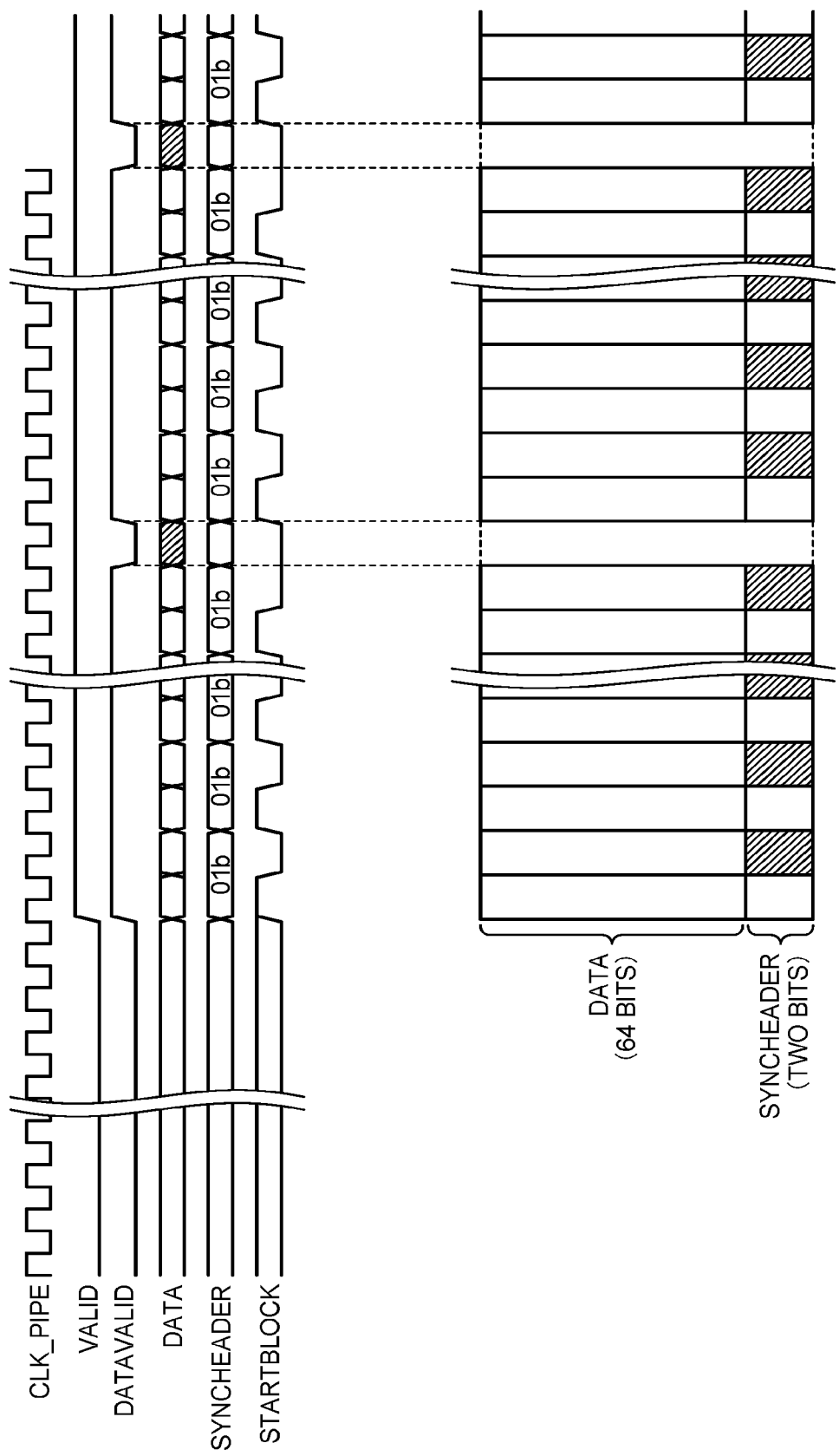
FIG. 1 illustrates a diagram for explaining a 128*b*/130*b* encoding scheme in an evaluation apparatus according to a first embodiment.

In general, according to one embodiment, there is provided an evaluation apparatus including a first data bus and a transmission device. The transmission device is electrically connected to the first data bus at an output side thereof and configured to receive data and another signal different from the data. The transmission device is configured to supply the data to the first data bus in a first period during which a valid signal is in an active level, and supply the another signal to the first data bus in a second period during which the valid signal is in a non-active level.

Exemplary embodiments of an evaluation apparatus will be explained below in detail with reference to the accompanying drawings. The present invention is not limited to the following embodiments.

First Embodiment

An evaluation apparatus according to a first embodiment is an apparatus that evaluates an interface which complies with the PCIe (registered trade mark) standard and in which pieces of data are connected in parallel between a data link layer interface (Link circuit) and a physical layer interface (PHY circuit). This interface is referred to as a PHY Interface for the PCI Express (registered trade mark) Architecture (PIPE) interface. At the time of evaluating the PIPE interface, the Link circuit which is a digital circuit, may be configured as an FPGA (Field Programmable Gate Array) semiconductor device, and the PHY circuit which is an analog circuit, may be configured as a TEG (Test Element Group) semiconductor device in some cases.

In the PCIe standard, since the third generation (Gen3), many control signals for an equalizer (Eq) are added as signals to be transferred in the PIPE interface. For this reason, the number of signal lines between the TEG semiconductor device including the PHY circuit and the FPGA semiconductor device including the Link circuit increases. Also, due to requirements of the PCIe standard, the data amount, that is, a bit width of data signals, to be transferred in the PIPE interface, increases. Thus, the number of pins for connection between the semiconductor device for the Link circuit and the semiconductor device for the PHY circuit may increase. In a case in which the number of pins increases, wasteful cost for producing the evaluation apparatus is easily generated, and cost for the test easily increases since it is difficult to use an existing FPGA and/or an existing TEG (that is, the FPGA and/or the TEG will be replaced with one(s) with more pins), for example. It is desired that the number of pins for connection between the semiconductor device for the Link circuit and the semiconductor device for the PHY circuit is smaller than the number of signals.

On the other hand, in the PCIe standard, since the third generation (Gen3), 128*b*/130*b* encoding scheme is employed as an encoding scheme for causing clock information to be embedded to data. In the 128*b*/130*b* encoding scheme, a two-bits preamble is added to a head of a 128-bits payload. The preamble indicates information about the payload. For example, "10" indicates that the payload is normal data while "01" indicates that the payload is control data. In the payload, clock information is superposed with data in a scrambling method.

FIG. 1 illustrates a diagram for explaining the 128*b*/130*b* encoding scheme in the evaluation apparatus 1 according to the first embodiment. An example of a waveform in the 128*b*/130*b* encoding scheme is illustrated in the upper-side view of FIG. 1. In the upper-side view of FIG. 1, CLK_PIPE is a clock for transmission. A VALID signal indicates a period during which data are transmitted when the VALID signal is in an active level. A DATAVALID signal indicates a period during which the data are valid in the period during which the data are transmitted when the DATAVALID signal is in an active level, and indicates a period during which the data are invalid in the period during which the data are transmitted when the DATAVALID signal is in a non-active level. DATA indicates a payload (hereinafter referred to simply as data as well) in the data to be transmitted. A SYNCHEADER signal indicates a preamble in the data to be transmitted. A STARTBLOCK signal indicates a head of a unit (BLOCK) for encoding in the data to be transmitted.

As illustrated in the waveform view in the upper-side view of FIG. 1, the data are transmitted with a two-bits preamble (that is, SYNCHEADER) added to a payload (that is, DATA). At this time, in the PIPE interface, a signal in which the payload (that is, DATA) and the preamble (that is, SYNCHEADER) are in parallel is transmitted as illustrated in the lower-side view of FIG. 1. For this reason, there is a subtle difference in data amount between the original transmission signal and the parallel signal transferred in the PIPE interface.

That is, as illustrated in the lower-side view of FIG. 1, in the PIPE interface, a bus width of the data bus is narrower than 128 bits, and a bus width of the preamble is two bits. For example, in the PIPE interface, the bus width of the data bus is eight bits, 16 bits, 32 bits, or 64 bits in many cases. FIG. 1 illustrates a case where the bus width of the data bus is 64 bits. For this reason, in the signal transferred on the preamble bus, surplus bits illustrated by hatching are generated as differences between the original transmission signal and the parallel signal.

In the PCIe standard, the DataValid signal is provided to absorb the differences, and it is required that the DataValid signal shall be deasserted at the time when backlogs of the surplus bits do not exceed the payload size (for example, 128 bits). Consequently, the backlogs of the surplus bits are collectively destroyed in a reception device in the PIPE interface, and the differences can be absorbed. The hatched data in the upper-side view of FIG. 1 is data to be transmitted in a period during which the DataValid signal is deasserted. Since the data is meaningless data for difference absorption, the data is discarded in the reception device. The meaningless data is in a 64-bits size, for example.

Under such circumstances, in the present embodiment, a goal of the evaluation apparatus is to cause the number of pins for connection between the semiconductor devices to be smaller than the number of signals by transmitting a control signal instead of data, to the data bus between the semiconductor devices in the period during which the DataValid signal is deasserted.

Figure 2:
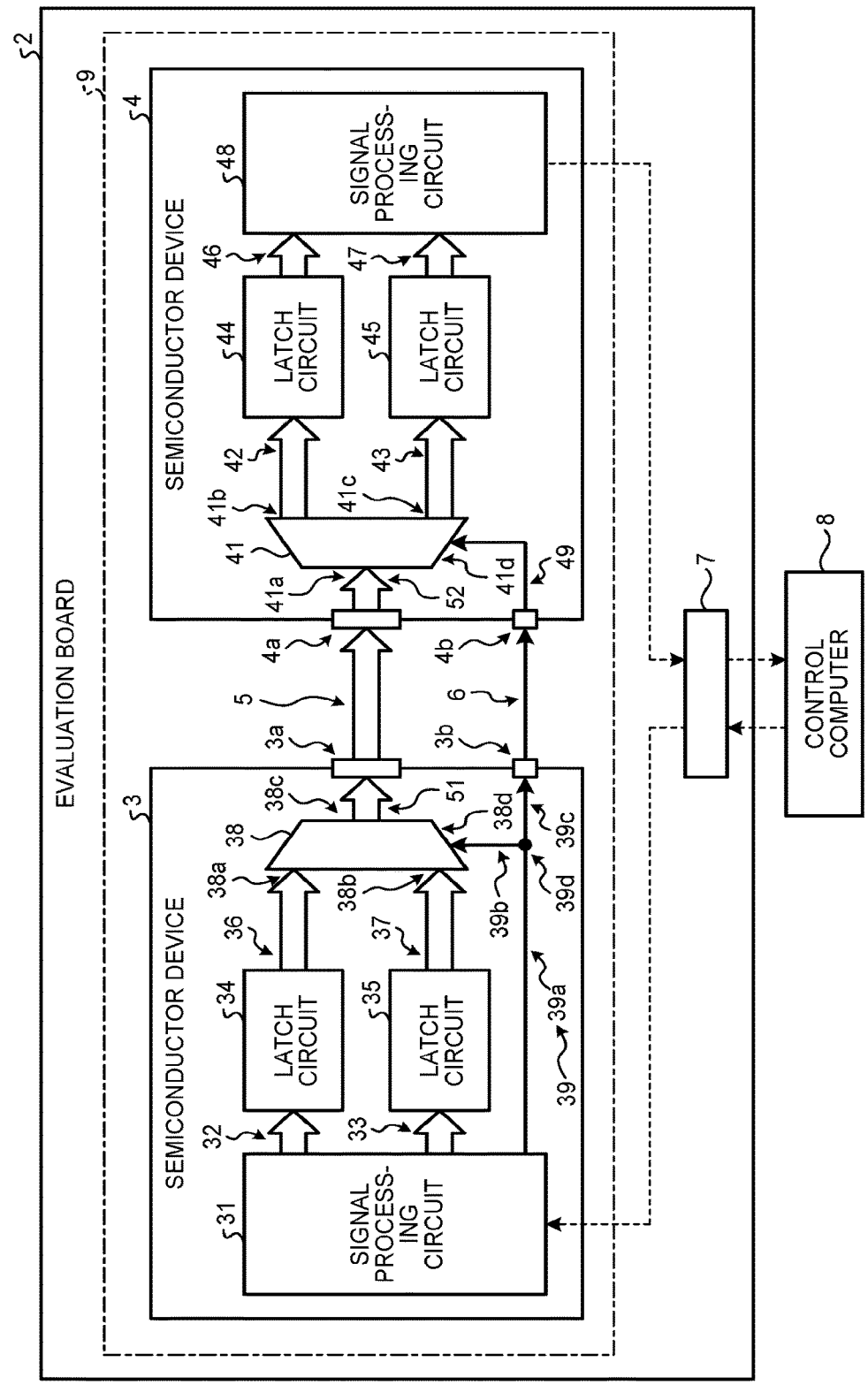
FIG. 2 illustrates a configuration of the evaluation apparatus according to the first embodiment.

Specifically, an evaluation apparatus 1 can be configured as illustrated in FIG. 2. FIG. 2 illustrates a configuration of the evaluation apparatus 1 according to the first embodiment. FIG. 2 illustrates a configuration for evaluating a transmission pass to an external device (for example, a host such as a CPU) and omits a configuration for evaluating a reception pass from an external device for simplification.

The evaluation apparatus 1 includes an evaluation board 2, a PIPE interface 9, a connector 7, and a control computer 8. The PIPE interface 9 includes a semiconductor device 3, a semiconductor device 4, a data bus 5, and a control line 6. The semiconductor device 3 is a semiconductor device as a transmission device in the PIPE interface 9. The semiconductor device 4 is a semiconductor device as a reception device in the PIPE interface 9. In a case of evaluating a transmission operation to the external device (for example, a host such as a CPU) in the PIPE interface 9, a Link circuit is mounted as an FPGA in the semiconductor device 3, a PHY circuit is mounted as a TEG in the semiconductor device 4, and the data bus 5 is mounted as a bus on which data are transferred from the transmission device to the reception device. In a case of evaluating a reception operation from an external device (for example, a host such as a CPU) in the PIPE interface 9, the data bus 5 is mounted as a bus on which data are transferred from the transmission device to the reception device. FIG. 2 illustrates the case of evaluating the transmission operation to the external device (for example, a host such as a CPU) in the PIPE interface 9.

The semiconductor device 3 and the semiconductor device 4 are mounted on the evaluation board 2 so as to transmit or receive a test signal to or from the control computer 8. For example, a test line of the control computer 8 is connected to the connector 7, a first socket and a second socket (both are not illustrated) electrically connected to the connector 7 are provided on the evaluation board 2, the semiconductor device 3 is mounted on the first socket, and the semiconductor device 4 is mounted on the second socket. As a result, the control computer 8 can transmit a test signal to the semiconductor device 3 via the connector 7 and the first socket, and can receive a test signal from the semiconductor device 4 via the second socket and the connector 7.

The semiconductor device (transmission device) 3 includes a signal processing circuit 31, a signal bus 32, a data bus 33, a latch circuit 34, a latch circuit 35, a signal bus 36, a data bus 37, a multiplexer 38, a control line 39, a data bus 51, a data pin group 3a, and a control pin 3b. The signal bus 32 is electrically connected between the signal processing circuit 31 and an input side of the latch circuit 34. The data bus 33 is electrically connected between the signal processing circuit 31 and an input side of the latch circuit 35. The signal bus 36 is electrically connected between an output side of the latch circuit 34 and an input node 38a of the multiplexer 38. The data bus 37 is electrically connected between an output side of the latch circuit 35 and an input node 38b of the multiplexer 38. The data bus 51 is electrically connected between an output node 38c of the multiplexer 38 and the data pin group 3a. The data pin group 3a is electrically connected to the semiconductor device 4 via the data bus 5. The control line 49 is electrically connected among the signal processing circuit 31, a control node 38d of the multiplexer 38, and the control pin 3b. The control line 49 includes lines 39a to 39c and a node 39d. The line 39a electrically connects the signal processing circuit 31 to the node 39d, the line 39b electrically connects the node 39d to the control node 38d of the multiplexer 38, and the line 39c electrically connects the node 39d to the control pin 3b. The control pin 3b is electrically connected to the semiconductor device 4 via the control line 6.

The semiconductor device (reception device) 4 includes a data pin group 4a, a control pin 4b, a data bus 52, a demultiplexer 41, a signal bus 42, a data bus 43, a latch circuit 44, a latch circuit 45, a signal bus 46, a data bus 47, a signal processing circuit 48, and a control line 49. The data pin group 4a is electrically connected to the data pin group 3a of the semiconductor device 3 via the data bus 5. The data bus 52 is electrically connected between the data pin group 4a and an input node 41a of the demultiplexer 41. The signal bus 42 is electrically connected between an output node 41b of the demultiplexer 41 and an input side of the latch circuit 44. The data bus 43 is electrically connected between an output node 41c of the demultiplexer 41 and an input side of the latch circuit 45. The signal bus 46 is electrically connected between an output side of the latch circuit 44 and the signal processing circuit 48. The data bus 47 is electrically connected between an output side of the latch circuit 45 and the signal processing circuit 48. The control pin 4b is electrically connected to the control pin 3b of the semiconductor device 3 via the control line 6. The control line 49 is electrically connected between the control pin 4b and a control node 41d of the demultiplexer 41.

Figure 3:
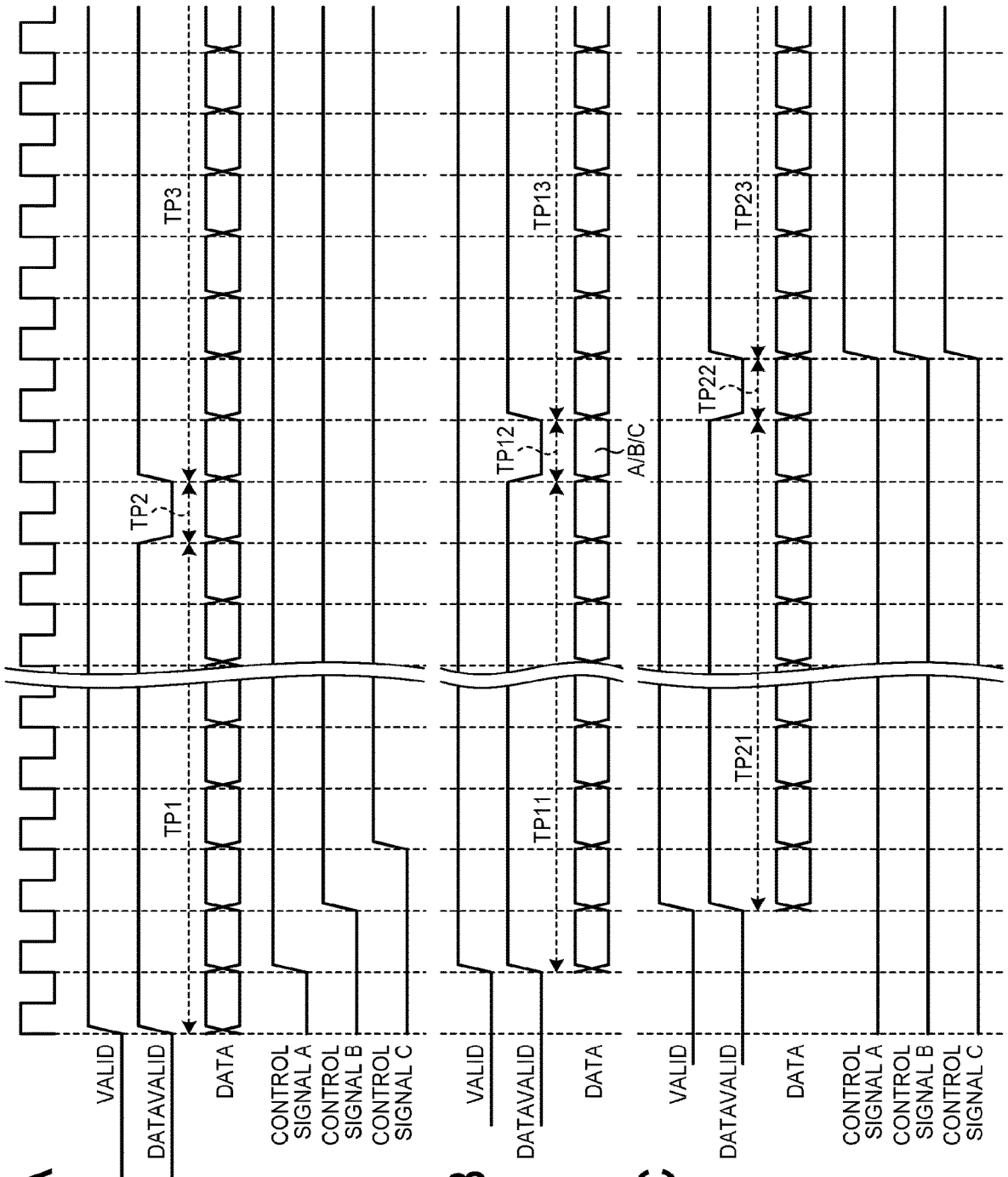
FIGS. 3A to 3C are waveform views illustrating operations of the evaluation apparatus according to the first embodiment.

For example, in the semiconductor device 3, the signal processing circuit 31 receives a test signal from the control computer 8 via the connector 7 and the first socket. In accordance with the test signal, the signal processing circuit 31 generates control signals A to C illustrated in FIG. 3A and supplies the control signals A to C to the latch circuit 34 via the signal bus 32, and generates data DATA illustrated in FIG. 3A and supplies the data DATA to the latch circuit 35 via the data bus 33. FIGS. 3A to 3C are waveform views illustrating operations of the semiconductor device 3 in the evaluation apparatus 1. As the control signals A to C, signals that change as little as to pose no problem even when slight latency is generated can be used. As the control signals A to C, signals that change less than the data DATA can be used. The latch circuit 34 latches the control signals A to C and supplies the latched control signals A to C to the multiplexer 38 via the signal bus 36. The latch circuit 35 latches the data DATA and supplies the latched data DATA to the multiplexer 38 via the data bus 37.

Also, the signal processing circuit 31 supplies the Data-Valid signal illustrated in FIG. 3A to the control node 38d of the multiplexer 38. The multiplexer 38 selects the input node 38b in a period TP1, during which the DataValid signal is in an active level (for example, an H level), selects the input node 38a in a period TP2, during which the DataValid signal is in a non-active level (for example, an L level), and selects the input node 38b again in a period TP3, during which the DataValid signal is in an active level. In other words, the multiplexer 38 selects the latch circuit 35 in the period TP1, selects the latch circuit 34 in the period TP2, and selects the latch circuit 35 again in the period TP3. The multiplexer 38 supplies the selected data or signal to the data bus 5 via the data bus 51 and the data pin group 3a.

Thus, as illustrated in FIG. 3B, in the data bus 5, the data DATA is transferred in a period TP11, during which the DataValid signal is asserted, the control signals A to C are transferred instead of the data in a period TP12, during which the DataValid signal is deasserted, and the data DATA is transferred again in a period TP13, during which the DataValid signal is asserted.

Also, in the semiconductor device 4, the demultiplexer 41 receives the data DATA illustrated in FIG. 3C via the data bus 5, the data pin group 4a, and the data bus 52 and receives the DataValid signal illustrated in FIG. 3C via the control line 6, the control pin 4b, and the control line 49. The demultiplexer 41 selects the output node 41c in a period TP21, during which the DataValid signal is in an active level (for example, an H level), selects the output node 41b in a period TP22, during which the DataValid signal is in a non-active level (for example, an L level), and selects the output node 41c again in a period TP23, during which the DataValid signal is in an active level (for example, an H level). In other words, the demultiplexer 41 selects the latch circuit 45 in the period TP21, selects the latch circuit 44 in the period TP22, and selects the latch circuit 45 again in the period TP23.

Thus, in the semiconductor device 4, the data DATA is supplied to the signal processing circuit 48 in the period TP21, the control signals A to C are supplied to the signal processing circuit 48 in the period TP22, and the data DATA is supplied to the signal processing circuit 48 in the period TP23. The signal processing circuit 48 restores the control signals A to C supplied from the latch circuit 45 in the period TP22 and supplies a test signal (signal as a test result) to the control computer 8 via the second socket and the connector 7 in accordance with the received data DATA and the restored control signals A to C. Accordingly, the control computer 8 can analyze the test result and evaluate a transmission operation of the PIPE interface 9.

That is, a transfer path for the control signals A to C and a transfer path for the data are used in common, and the control signals A to C and the data are transferred from the semiconductor device 3 to the semiconductor device 4 in a path of semiconductor device (transmission device) 3→data pin group 3a→data bus 5→data pin group 4a→semiconductor device (reception device) 4. Accordingly, the number of pins for connection between the semiconductor device 3 and the semiconductor device 4 can be reduced.

Figure 4:
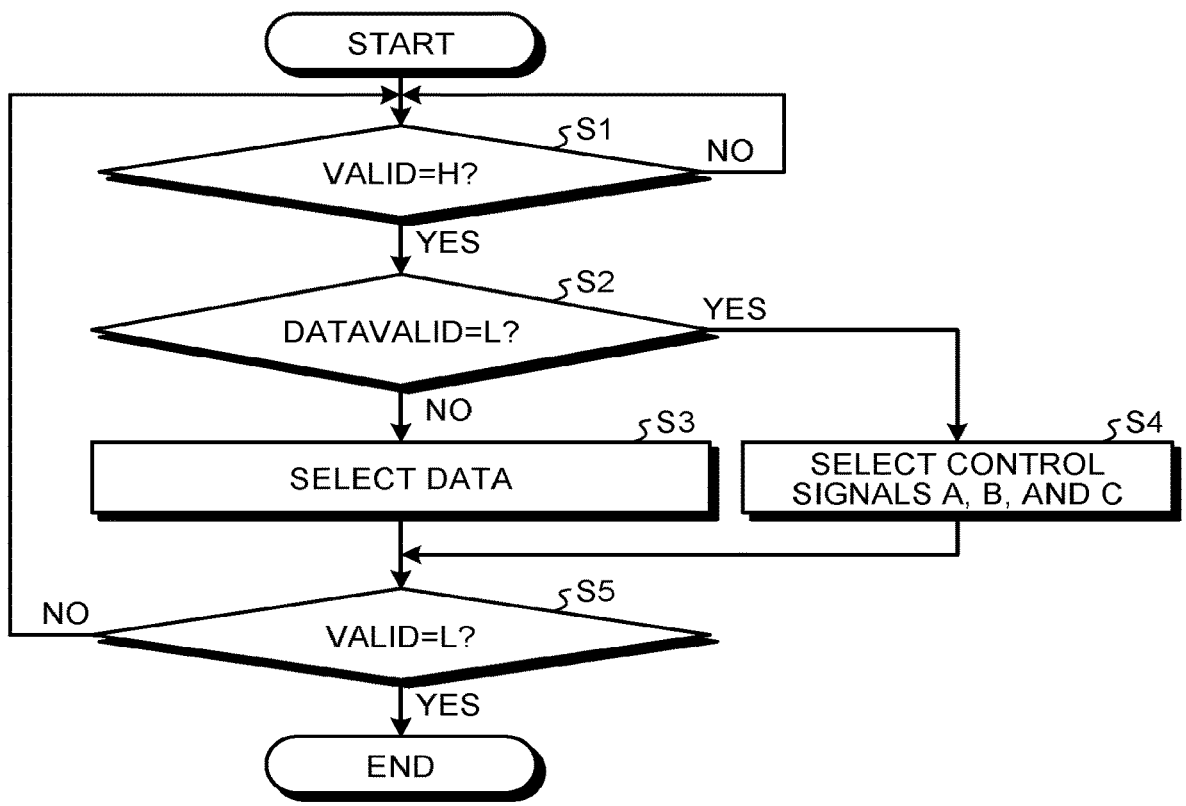
FIG. 4 is a flowchart illustrating operations of the evaluation apparatus according to the first embodiment.

Next, operations of the evaluation apparatus 1 will be described with reference to FIG. 4. FIG. 4 is a flowchart illustrating operations of the evaluation apparatus 1. Here, a transmission side and a reception side will respectively be described with reference to FIG. 4.

The semiconductor device (transmission device) 3 stands by until VALID signal=H is established ("No" in S1). When VALID signal=H is established ("Yes" in S1), the semiconductor device 3 checks the DATAVALID signal. When DATAVALID signal=H is established ("No" in S2), the semiconductor device 3 selects the data DATA and transmits the data DATA to the data bus 5 (S3). When DATAVALID signal=L is established ("Yes" in S2), the semiconductor device 3 selects the control signals A to C and transmits the control signals A to C to the data bus 5 (S4). The semiconductor device 3 repeats the loop processing from S1 to S4 while VALID signal=L is not established ("No" in S5). When VALID signal=L is established ("Yes" in S5), the semiconductor device 3 ends the processing.

Also, the semiconductor device (reception device) 4 stands by until VALID signal=H is established ("No" in S1). When VALID signal=H is established ("Yes" in S1), the semiconductor device 4 checks the DATAVALID signal. When DATAVALID signal=H is established ("No" in S2), the semiconductor device 3 selects the data DATA and performs signal processing (S3). When DATAVALID signal=L is established ("Yes" in S2), the semiconductor device 3 selects the control signals A to C and performs signal processing (S4). The semiconductor device 3 repeats the loop processing from S1 to S4 while VALID signal=L is not established ("No" in S5). When VALID signal=L is established ("Yes" in S5), the semiconductor device 3 ends the processing.

As described above, in the first embodiment, in the evaluation apparatus 1, the control signals, instead of the data, are transmitted to the data bus 5 between the semiconductor devices 3 and 4 via the data transfer path in the period during which the DataValid signal is deasserted. Accordingly, since the number of pins for connection between the semiconductor devices 3 and 4 can be smaller than the number of signals, cost for the test can easily be reduced.

Second Embodiment

Next, an evaluation apparatus according to a second embodiment will be described. Hereinafter, different parts from those in the first embodiment will mainly be described.

Figure 5:
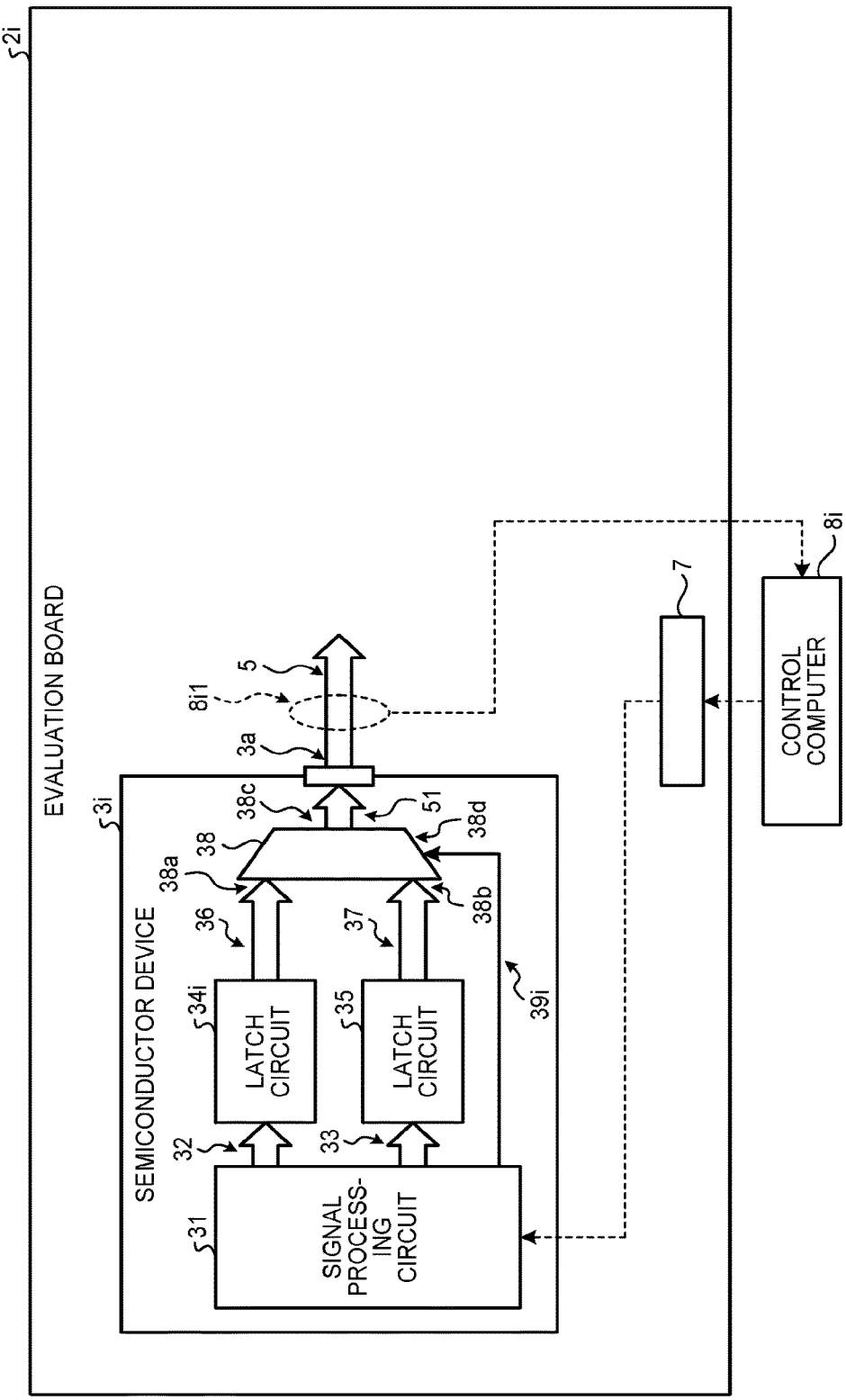
FIG. 5 illustrates a configuration of an evaluation apparatus according to a second embodiment.

As illustrated in FIG. 5, in an evaluation apparatus 1i according to the second embodiment, the semiconductor device 4 (refer to FIG. 1) is omitted, and the data bus 5 is electrically connected to a control computer 8i via a probe 8i1. Also, a semiconductor device 3i is configured so that the control pin 3b (refer to FIG. 1) may be omitted, and so that a control line 39i may connect the signal processing circuit 31 to the control node 38d of the multiplexer 38.

The signal processing circuit 31 may include a state machine, and to debug a state of the state machine, the signal processing circuit 31 may supply a signal indicating the state of the state machine to a latch circuit 34i via the signal bus 32 as debug information. The latch circuit 34i latches the debug information and supplies the latched debug information to the multiplexer 38 via the signal bus 36.

Figure 6A:
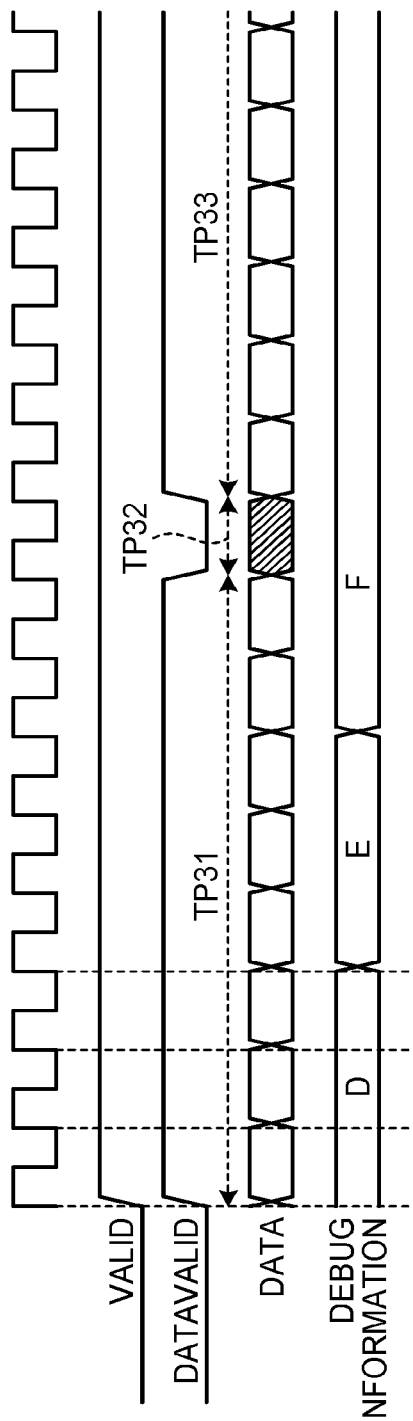
FIGS. 6A and 6B are waveform views illustrating operations of the evaluation apparatus according to the second embodiment.
Figure 6B:
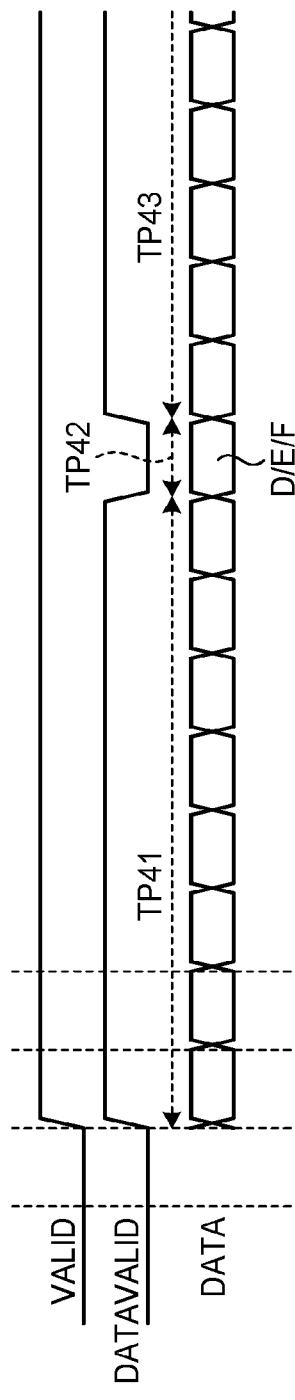

For example, in the semiconductor device 3i, the signal processing circuit 31 receives a test signal from the control computer 8i via the connector 7 and the first socket. In accordance with the test signal, the signal processing circuit 31 generates debug information pieces D to F illustrated in FIG. 6A and supplies the debug information pieces D to F to the latch circuit 34*i* via the signal bus 32, and generates data DATA illustrated in FIG. 6A and supplies the data DATA to the latch circuit 35 via the data bus 33. FIGS. 6A and 6B are waveform views illustrating operations of the semiconductor device 3*i* in the evaluation apparatus 1*i*. The latch circuit 34*i* latches the debug information pieces D to F and supplies the latched debug information pieces D to F to the multiplexer 38 via the signal bus 36. The latch circuit 35 latches the data DATA and supplies the latched data DATA to the multiplexer 38 via the data bus 37.

Also, the signal processing circuit 31 supplies the Data-Valid signal illustrated in FIG. 6A to the control node 38*d* of the multiplexer 38. The multiplexer 38 selects the input node 38*b* in a period TP31, during which the DataValid signal is in an active level (for example, an H level), selects the input node 38*a* in a period TP32, during which the DataValid signal is in a non-active level (for example, an L level), and selects the input node 38*b* again in a period TP33, during which the DataValid signal is in an active level. In other words, the multiplexer 38 selects the latch circuit 35 in the period TP31, selects the latch circuit 34*i* in the period TP32, and selects the latch circuit 35 again in the period TP33. The multiplexer 38 supplies the selected data or debug information from the output node 38*c* to the data bus 5 via the data bus 51 and the data pin group 3*a*.

Thus, as illustrated in FIG. 6B, in the data bus 5, the data DATA is transferred in a period TP41, during which the DataValid signal is asserted, the debug information pieces D to F are transferred instead of the data in a period TP42, during which the DataValid signal is deasserted, and the data DATA is transferred again in a period TP43, during which the DataValid signal is asserted. Accordingly, the control computer 8*i* can monitor the data DATA in the period TP41, monitor the debug information pieces D to F in the period TP42, and monitor the data DATA again in the period TP43 via the probe 8*i*1. In other words, according to the second embodiment, the control computer 8*i* can monitor original data and debug information by means of one probe 8*i*1 and can perform debugging efficiently.

Figure 7:
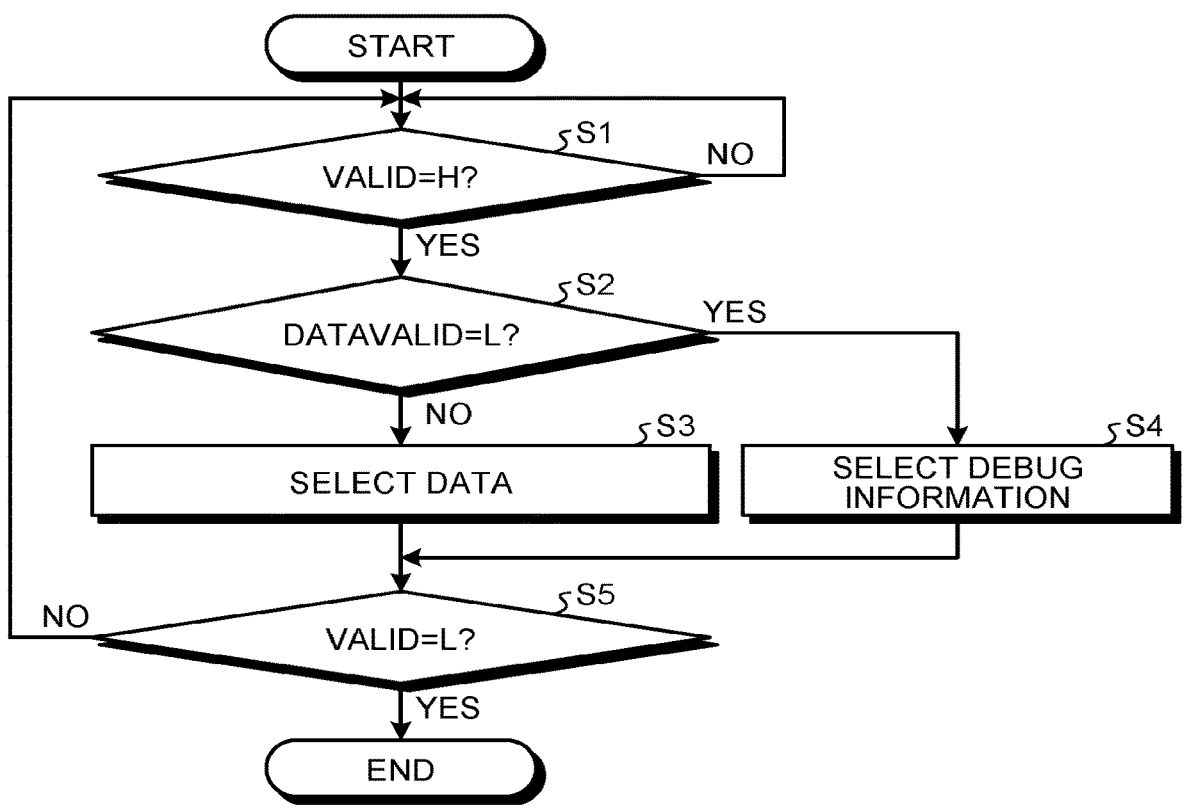
FIG. 7 is a flowchart illustrating operations of the evaluation apparatus according to the second embodiment.

Next, operations of the evaluation apparatus 1*i* will be described with reference to FIG. 7. FIG. 7 is a flowchart illustrating operations of the evaluation apparatus 1*i*. In FIG. 7, identical steps to those in the flowchart in FIG. 4 are labeled with the same numerals.

The semiconductor device (transmission device) 3*i* stands by until VALID signal=H is established ("No" in S1). When VALID signal=H is established ("Yes" in S1), the semiconductor device 3*i* checks the DATAVALID signal. When DATAVALID signal=H is established ("No" in S2), the semiconductor device 3*i* selects the data DATA and transmits the data DATA to the data bus 5 (S3). When DATAVALID signal=L is established ("Yes" in S2), the semiconductor device 3*i* selects the debug information pieces D to F and transmits the debug information pieces D to F to the data bus 5 (S14). The semiconductor device 3*i* repeats the loop processing from S1 to S3 and S14 while VALID signal=L is not established ("No" in S5). When VALID signal=L is established ("Yes" in S5), the semiconductor device 3*i* ends the processing.

As described above, in the second embodiment, in the evaluation apparatus 1*i*, the debug information pieces, instead of the data, are transmitted to the data bus 5 via the data transfer path in the period during which the DataValid signal is deasserted. Accordingly, original data and debug information can be monitored by means of one probe 8*i*1, and debugging can be performed efficiently.

Third Embodiment

Next, a semiconductor apparatus according to a third embodiment will be described. Hereinafter, different parts from those in the first and second embodiments will mainly be described.

Figure 8:
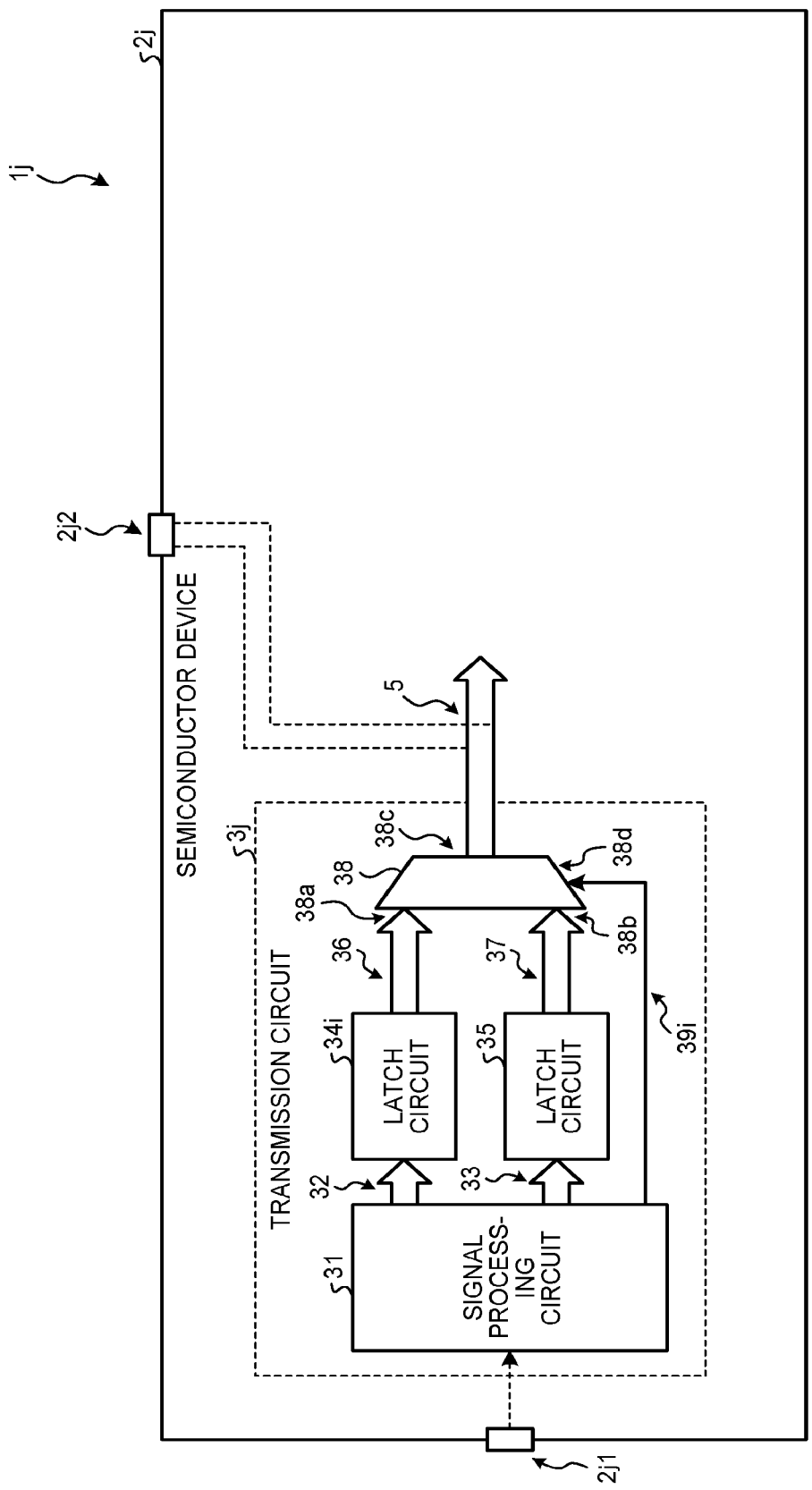
FIG. 8 illustrates a configuration of a semiconductor apparatus according to a third embodiment.

As illustrated in FIG. 8, in a semiconductor apparatus 1*j* according to the third embodiment, an evaluation board 2*i* (refer to FIG. 5) is replaced with a semiconductor device 2*j*, and the semiconductor device 3*i* (refer to FIG. 5) is replaced with a transmission circuit 3*j*. Since the transmission circuit 3*j* is implemented on the semiconductor device 2*j* to function as a circuit, the data pin group 3*a* (refer to FIG. 5) is omitted. Also, the semiconductor device 2*j* includes a control terminal 2*j*1 and a debug terminal 2*j*2. The control terminal 2*j*1 is electrically connected to the signal processing circuit 31. The debug terminal 2*j*2 is electrically connected to the data bus 5. The debug terminal 2*j*2 is a terminal that can electrically be connected to an external device.

For example, in the transmission circuit 3*j*, the signal processing circuit 31 receives a control signal from an external controller via the control terminal 2*j*1. In accordance with the control signal, the signal processing circuit 31 generates debug information pieces D to F illustrated in FIG. 6A and supplies the debug information pieces D to F to the latch circuit 34*i* via the signal bus 32, and generates data DATA illustrated in FIG. 6A and supplies the data DATA to the latch circuit 35 via the data bus 33. FIGS. 6A and 6B are waveform views illustrating operations of the semiconductor device 3*i* in the evaluation apparatus 1*i* and are also used for description of the third embodiment. The latch circuit 34*i* latches the debug information pieces D to F and supplies the latched debug information pieces D to F to the multiplexer 38 via the signal bus 36. The latch circuit 35 latches the data DATA and supplies the latched data DATA to the multiplexer 38 via the data bus 37.

Also, the signal processing circuit 31 supplies the DataValid signal illustrated in FIG. 6A to the control node 38*d* of the multiplexer 38. The multiplexer 38 selects the input node 38*b* in a period TP31, during which the DataValid signal is in an active level (for example, an H level), selects the input node 38*a* in a period TP32, during which the DataValid signal is in a non-active level (for example, an L level), and selects the input node 38*b* again in a period TP33, during which the DataValid signal is in an active level. In other words, the multiplexer 38 selects the latch circuit 35 in the period TP31, selects the latch circuit 34*i* in the period TP32, and selects the latch circuit 35 again in the period TP33. The multiplexer 38 supplies the selected data or debug information to the data bus 5.

Thus, as illustrated in FIG. 6B, in the data bus 5, the data DATA is transferred in a period TP41, during which the DataValid signal is asserted, the debug information pieces D to F are transferred instead of the data in a period TP42, during which the DataValid signal is deasserted, and the data DATA is transferred again in a period TP43, during which the DataValid signal is asserted. Accordingly, the external controller can monitor the data DATA in the period TP41, monitor the debug information pieces D to F in the period TP42, and monitor the data DATA again in the period TP43 via the debug terminal 2*j*2. In other words, according to the third embodiment, the external controller can monitor original data and debug information by means of one debug terminal 2*j*2 and can perform debugging efficiently.

Next, operations of the semiconductor apparatus 1j will be described with reference to FIG. 7 again.

The transmission circuit 3j stands by until VALID signal=H is established ("No" in S1). When VALID signal=H is established ("Yes" in S1), the transmission circuit 3j checks the DATAVALID signal. When DATAVALID signal=H is established ("No" in S2), the transmission circuit 3j selects the data DATA and transmits the data DATA to the data bus 5 (S3). When DATAVALID signal=L is established ("Yes" in S2), the semiconductor device 3i selects the debug information pieces D to F and transmits the debug information pieces D to F to the data bus 5 (S14). The transmission circuit 3j repeats the loop processing from S1 to S3 and S14 while VALID signal=L is not established ("No" in S5). When VALID signal=L is established ("Yes" in S5), the transmission circuit 3j ends the processing.

As described above, in the third embodiment, in the semiconductor apparatus 1j, the debug information pieces, instead of the data, are transmitted to the data bus 5 in the period during which the DataValid signal is deasserted. Accordingly, original data and debug information can be monitored by means of one debug terminal 2j2, and debugging can be performed efficiently.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An evaluation apparatus comprising:
   a first data bus; and
   a transmission device that is electrically connected to the first data bus at an output side thereof and configured to receive data and another signal different from the data,
   wherein the transmission device is configured to supply the data to the first data bus in a first period during which a valid signal is in an active level, and supply a signal corresponding to the received another signal to the first data bus in a second period during which the valid signal is in a non-active level.

2. The evaluation apparatus according to claim 1, wherein the transmission device comprises
   a multiplexer that includes a first bus input node, a second bus input node, a first control node, and a first bus output node electrically connected to the first data bus,
   a first circuit that is electrically connected to the first bus input node via a second data bus,
   a second circuit that is electrically connected to the second bus input node via a first signal bus, and
   a first control line that is electrically connected to the first control node and configured to transfer the valid signal to the first control node.

3. The evaluation apparatus according to claim 2, wherein the transmission device further comprises
   a first data pin group, and the first bus output node is electrically connected to the first data bus via the first data pin group.

4. The evaluation apparatus according to claim 2, wherein the multiplexer is configured to select the first circuit in the first period and select the second circuit in the second period.

5. The evaluation apparatus according to claim 2, further comprising:
   a reception device that is electrically connected to the transmission device via the first data bus,
   wherein the reception device comprises
      a demultiplexer that includes a third bus input node to which the first data bus is connected, a second control node, a second bus output node, and a third bus output node,
      a third circuit that is electrically connected to the second bus output node via a third data bus,
      a fourth circuit that is electrically connected to the third bus output node via a second signal bus, and
      a second control line that is connected to the second control node and configured to transfer the valid signal to the second control node.

6. The evaluation apparatus according to claim 5,
   wherein the transmission device further comprises a first data pin group,
   the reception device further comprises a second data pin group,
   the first bus output node is electrically connected to the first data bus via the first data pin group, and
   the third bus input node is electrically connected to the first data bus via the second data pin group.

7. The evaluation apparatus according to claim 5,
   wherein the transmission device is implemented as an FPGA (Field Programmable Gate Array), and
   the reception device is implemented as a TEG (Test Element Group).

8. The evaluation apparatus according to claim 5,
   wherein the multiplexer is configured to select the first circuit in the first period and select the second circuit in the second period, and
   the demultiplexer selects the third circuit in a third period during which the valid signal received at the second control node is in an active level, and select the fourth circuit in a fourth period during which the valid signal received at the second control node is in a non-active level.

9. The evaluation apparatus according to claim 1, wherein the another signal includes debug information.

10. The evaluation apparatus according to claim 1, wherein the transmission device is implemented as an FPGA (Field Programmable Gate Array).

11. The evaluation apparatus according to claim 1, further comprising:
    a reception device that is electrically connected to the transmission device via the first data bus,
    wherein the reception device is configured to process the data in a third period during which the valid signal transferred from the transmission device is in an active level, and process the another signal in a fourth period during which the valid signal transferred from the transmission device is in a non-active level.

12. The evaluation apparatus according to claim 1, wherein the another signal includes a signal configured to vary in terms of a level less than the data in a particular period.

13. The evaluation apparatus according to claim 1, wherein the data are encoded in a 128b/130b encoding scheme.

14. A semiconductor apparatus comprising:
    a transmission circuit; and
    a first data bus that is electrically connected to the transmission circuit,
    wherein the transmission circuit comprises a multiplexer comprising a first bus input node, a second bus input node, a control node, and a bus output node electrically connected to the first data bus, a first circuit that is electrically connected to the first bus input node via a second data bus and configured to supply data to the first bus input node, a second circuit that is electrically connected to the second bus input node via a first signal bus and configured to supply another signal different from the data to the second bus input node, and a control line that is electrically connected to the control node and configured to transfer a valid signal to the control node, and wherein the multiplexer is configured to select the first circuit and supply the data to the first data bus in a first period during which the valid signal is in an active level, and select the second circuit and supply a signal corresponding to the supplied another signal to the first data bus in a second period during which the valid signal is in a non-active level.

15. The semiconductor apparatus according to claim 14, further comprising:

a terminal that is electrically connected to the first data bus.

16. The semiconductor apparatus according to claim 15, wherein the terminal is a terminal being capable of electrically connect to an external device.

17. The semiconductor apparatus according to claim 15, wherein the another signal includes debug information.

18. A transmission control method for a transmission device configured to receive data and another signal different from the data, the method comprising:

supplying first data to a data bus connected to an output side of the transmission device in a first period during which a valid signal is in an active level;

supplying a signal corresponding to the received another signal to the data bus in a second period during which the valid signal is in a non-active level; and supplying second data to the data bus in a third period during which the valid signal is in an active level.

19. The transmission control method according to claim 18, wherein the supplying the first data comprises selecting a first circuit by a multiplexer in the transmission device, the transmission device comprising the multiplexer, the first circuit, and a second circuit, the multiplexer including a first bus input node, a second bus input node, and a first bus output node electrically connected to the first data bus, the first circuit being electrically connected to the first bus input node via a second data bus, the second circuit being electrically connected to the second bus input node via, a first signal bus, the supplying the signal corresponding to the received another signal comprises selecting the second circuit by the multiplexer, and the supplying the second data comprises selecting the first circuit by the multiplexer.

20. The transmission control method according to claim 18, wherein the another signal includes a signal configured to vary in terms of a level less than the data in a particular period.

* * * * *